（12) United States Patent
Marshall et al.

(10) Patent No.: US 7,543,780 B1
(45) Date of Patent: Jun. 9, 2009

(54) UNMANNED AIR VEHICLE TRANSMISSION LINE DOCKING SURVEILLANCE

(75) Inventors: Patrick T. Marshall, Tipp City, OH (US); Douglas M. Abner, Yellow Springs, OH (US); Robert Williams, Riverside, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 720 days.

(21) Appl. No.: 11/344,631

(22) Filed: Jan. 13, 2006

Related U.S. Application Data (63) Continuation-in-part of application No. 11/169,260, filed on Jun. 24, 2005, now Pat. No. 7,318,564.

(60) Provisional application No. 60/617,798, filed on Oct. 4, 2004.

(51) Int. Cl.
*G05D 1/00* (2006.01)
*B64C 13/20* (2006.01)

(52) U.S. Cl. .................. 244/194; 244/190; 244/175; 244/110 G; 701/3

(58) Field of Classification Search .............. 244/175, 244/183, 190, 194, 195, 110 C, 110 E, 110 F, 244/110 R, 110 G, 53 R–53 B, 1 R, 100 R; 701/3, 200, 207, 11; 320/108, 109; 191/10
See application file for complete search history.

(56) References Cited

U.S. PATENT DOCUMENTS

| | | | |
|---|---|---|---|
| 3,938,018 A | 2/1976 | Dahl | |
| 4,277,771 A | 7/1981 | Chapin et al. | |
| 4,384,289 A | 5/1983 | Stillwell et al. | |
| 4,625,172 A | 11/1986 | Yamamura et al. | |
| 4,649,375 A | 3/1987 | Duppong et al. | |
| 4,737,788 A * | 4/1988 | Kennedy | 342/29 |
| 4,818,990 A * | 4/1989 | Fernandes | 340/870.07 |
| 4,886,980 A | 12/1989 | Fernandes et al. | |
| 5,157,319 A | 10/1992 | Klontz et al. | |
| 5,301,096 A | 4/1994 | Klontz et al. | |
| 5,548,279 A | 8/1996 | Gaines | |
| 6,100,663 A | 8/2000 | Boys et al. | |
| 6,178,363 B1 | 1/2001 | McIntyre et al. | |
| 6,270,038 B1 | 8/2001 | Cycon et al. | |
| 6,477,449 B1 | 11/2002 | Conner et al. | |

(Continued)

OTHER PUBLICATIONS

A.V. Mamishev et al, "Effects of Conductor Sag on Spatial Distribution of Power Line Magnetic Field", IEEE Transactions on Power Delivery, Jul. 3, 1996, vol. 11, No. 3.

*Primary Examiner*—Michael R Mansen
*Assistant Examiner*—Joshua J Michener
(74) *Attorney, Agent, or Firm*—AFMCLO/JAZ; Gerald B. Hollins (57) ABSTRACT

A small unmanned air vehicle system having autonomous electrical energy transmission line docking capability and especially usable in military or other surveillance situations. Transmission line field sensing by the small unmanned air vehicle is used as an addition to global position system and other navigation methods and is especially applied to vehicle docking maneuvers. A plurality of vehicle carried electromagnetic fields-responsive sensors provides transmission line based signals to the vehicle guidance system in both far field and near field environments. Surveillance sensors are included in the vehicle payload. Vehicle battery charging energy procurement from the transmission line docking is included. Related commonly assigned patent documents are identified.

18 Claims, 5 Drawing Sheets

U.S. PATENT DOCUMENTS 6,847,587 B2 1/2005 Patterson et al.
6,859,729 B2 2/2005 Breakfield et al.
6,868,314 B1 3/2005 Frink

* cited by examiner

Fig. 1

*Fig. 2A*
Plot of Catenary Magnetic Fields Detected from below the Power Line

*Fig. 2B*
Plot of Catenary Magnetic Fields Detected from below the Power Line (cont.'d)

UNMANNED AIR VEHICLE TRANSMISSION LINE DOCKING SURVEILLANCE

CROSS REFERENCE TO RELATED PATENT DOCUMENT

The present application is a Continuation in Part of the commonly assigned parent U.S. patent application "POWER LINE SENTRY CHARGING", Ser. No. 11/169,260, filed on 24 Jun. 2005 now U.S. Pat. No. 7,318,564. The contents of this parent application are hereby incorporated by reference herein.

The present document is also somewhat related to the copending and commonly assigned patent document "POWER LINE SENTRY", Ser. No. 11/169,259 also filed on 24 Jun. 2005. The contents of this somewhat related application are hereby incorporated by reference herein.

Each of the Ser. Nos. 11/169,259 and 11/169,260 documents claims the priority of U.S. Provisional Patent Application 60/617,798 filed 4 Oct. 2004.

CLAIM OF PRIORITY

This application also claims the benefit of U.S. Provisional Patent Application 60/617,798 filed 4 Oct. 2004. The contents of this provisional application are hereby incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

Reconnaissance of surface areas on the earth using orbiting satellites can provide a broad overview of an area each time the satellite passes over the area. However, there are a variety of military and civilian situations that require a greater degree of reconnaissance detail or require that the data be provided during a time when either no reconnaissance satellite is in position or no satellite receiver is available. For such situations a person is typically deployed in the area of interest either on foot or by vehicle in order to perform the necessary surveillance. However, such deployment can be dangerous, e.g., inside enemy territory, in fires or other disaster-stricken areas, in areas of toxic spills or leaks, in harsh environments, etc. Additionally, areas to be monitored may be too remote and thereby make a personnel deployment too impractical or expensive. The same limitations hold for situations or areas that must be monitored for a longer period of time. As a result, there has been a recent increased emphasis on the use of a small unmanned air vehicle (SUAV) for performing such activities in both civilian and military situations where the use of manned flight or ground vehicles or human observer is not appropriate and/or feasible. Such missions may for example include surveillance, reconnaissance, target acquisition and/or designation, data acquisition, communications relay, decoy, jamming, harassment, ordnance delivery, or supply flights. This increased emphasis on the role of SUAVs in today's (and tomorrow's) society has led to advancement in both design and propulsion systems of these vehicles.

When small unmanned electrical air vehicles are used for these purposes present day limitations in battery technology become rapidly apparent. As a result of these battery limitations many of the missions that otherwise could be performed by a small unmanned air vehicle are either compromised or regarded as impractical. For example the deployment of a small electrical unmanned air vehicle over significant distances between friendly and hostile locations is quite expensive in terms of vehicle energy storage and operating life hence use of local vehicle parking, for example on adjacent electrical transmission line components, is being considered as is suggested in the above identified U.S. patent applications.

One significant aspect of such local vehicle parking on adjacent electrical transmission line components is concern over the ability of such vehicles to safely achieve a parked status, that is to accomplish the parking and release events without damage to the vehicle or the complex equipment it carries and to achieve this state without use of human intervention or extensive external instruction. The present invention is believed to provide assistance in this area.

SUMMARY OF THE INVENTION

The present invention provides a small unmanned air vehicle guidance arrangement usable for docking the vehicle on an electrical transmission line conductor.

It is therefore an object of the present invention to provide a terminal guidance arrangement for a small unmanned air vehicle.

It is another object of the invention to provide an electrical transmission line electromagnetic field responsive guidance system for docking a small unmanned air vehicle.

It is another object of the invention to provide a flight termination extension for an already transmission line responsive flight control system for a small unmanned air vehicle.

It is another object of the invention to provide a supplement for or a replacement for sight based visual image docking of a small unmanned air vehicle.

It is another object of the invention to provide a magnetic field responsive supplement for or replacement for a sight based visual image transmission line conductor docking of a small unmanned air vehicle.

These and other objects of the invention will become apparent as the description of the representative embodiments proceeds.

These and other objects of the invention are achieved by a small unmanned air vehicle electrical transmission line docking surveillance apparatus comprising the combination of:

a small unmanned air vehicle having a combination closable magnetic circuit and docking support magnetic field energy responsive element received therein;

a plurality of electric and magnetic field sensing elements disposed on dispersed external physical portions of said small unmanned air vehicle;

a small unmanned air vehicle flight control apparatus having an electrical signal input port and a plurality of said small unmanned air vehicle flight surface connected mechanical output signals;

small unmanned air vehicle electrical propulsion apparatus having an electrical energy input port and an electrical control signal input port;

a rechargeable electrical battery received within said small unmanned air vehicle and selectively connected with said closable magnetic circuit, said flight surface control apparatus, and said electrical propulsion apparatus;

a programmable electronic computer apparatus energized by said rechargeable electrical battery and having electrical output signals controlling said closable magnetic circuit, said flight surface control apparatus, and said electrical propulsion apparatus;

said programmable electronic computer apparatus including a transmission line catenary shape detection algorithm responsive to signals generated in said electric and magnetic field sensing elements and an unmanned air vehicle guidance algorithm responsive to said vehicle approaching a selected docking location along a vehicle encountered transmission line catenary curve.

BRIEF DESCRIPTION OF THE DRAWINGS

The accompanying drawings incorporated in and forming a part of the specification, illustrate several aspects of the present invention and together with the description serve to explain the principles of the invention. In the drawings:

FIG. 2 includes the views of FIG. 2A and FIG. 2B and shows two magnetic field patterns generated by a catenary disposed electrical transmission line.

DETAILED DESCRIPTION

To achieve accurate navigation, many airborne surveillance systems rely upon the global position system and, particularly, the differential global position system. Until now the global position system has in fact been the main navigation aid for these platforms. The present invention presents an additional supplementary navigation arrangement using electrical transmission lines as an aid to this global position system guidance particularly in terminal portions of a surveillance event. The invention in this document relates generally to the field of control apparatus and more specifically to apparatus for detecting the presence of high voltage high current transmission lines and their use as a navigational aid for dirigible craft such as aircraft, most specifically a small unmanned air vehicle of the electrically propelled type operating in a terminal flight portion. The disclosed guidance arrangement is passive, simple, and effective against known countermeasures.

Figure 3:
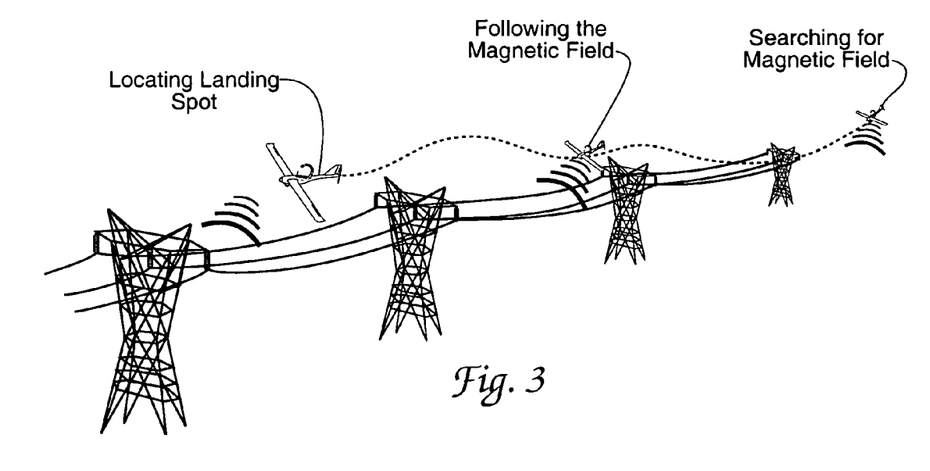
FIG. 3 shows a perspective view of a typical cross country high-voltage electrical transmission line and present invention responses thereto.

The present invention provides a guidance system operating by detecting the electric and/or electromagnetic field surrounding high voltage electrical transmission line conductors located perhaps miles away from an aircraft mounted detecting system. Functionally the invention comprises apparatus measuring signals emanating from the electromagnetic field of an electrical transmission line and means by which the position or orientation of the sensing apparatus with respect the source of the field may be determined. A conventional electrical energy transmission line as is shown in the FIG. 3 drawing herein is taken as a suitable field source, such transmission lines often transmit alternating current energy over long distances and of course their physical location with respect to a surveillance target or other target is known and unchanging. The present guidance system is useful in both the transport and terminal portions of a surveillance mission. In the context of the present invention the terminal portion includes temporary mission interruptions or pauses for both surveillance and energy collection purposes as is described in the above identified incorporated by reference herein patent documents.

As is well known in the electrical art, any conductor transmitting alternating electrical energy is surrounded by detectable fields, fields the nature of which depends on the distance from the conductor and the frequency of the alternating current energy. A portion of the energy supplied to such a conductor appears as an alternating induction field surrounding the conductor, while a second portion of the energy appears as a radiation field emanating from the conductor. The induction field predominates over the radiation field for distances from the conductor of less than $\lambda/2\pi$ where $\lambda$ is the alternating current wave length. For a frequency of 60 cycles per second, $\lambda/2\pi$ is approximately 500 miles. Since the present invention contemplates operation very much closer than 500 miles to the conductor, the far zone or radiation field is not significant, and discussion herein refers to the induction or near zone field.

A transmission line induction field moreover has two components, one electric and one magnetic. It has been found that the magnetic induction field is a function of current flow in the conductor. For electrical energy transmission lines, this means that without proper filtering and signal conditioning, magnetic induction field varies unpredictably in response to line load changes. Hence it would seem, at first thought, that magnetic fields are undesirable for navigation purposes. This is especially evident since every effort is made to maintain the voltage of such a transmission line at a constant value. The electric induction field, which is related to the line voltage, is of constant amplitude and thus generates E-Fields that are constant magnitudes at a single point in time. The E-Fields are a desirable signal source for present navigation purposes. However, the strength of the magnetic field is proportional to the amount of current flowing in the line which is extremely important for recharging purposes. One would not want to land on a power line only to find there is no current flowing. This could potentially be disastrous if there is not enough battery energy remaining to locate another suitable power line. As a result, only magnetic sensors are presently used to determine if a particular power line is a suitable landing spot. As such, both types of sensors have their advantages and disadvantages and some combination of both are preferably used in this invention. It is preferable that the electrostatic sensors be used to help locate and navigate along power lines and that magnetic sensors be used to help determine if the power line is suitable. Once it is determined that suitable current is flowing, either sensor can be suitable for use during the landing process (i.e., docking) onto the power line.

The present invention is based on the concept that the orientation of the transmission line E-field and B-field axis relative to the air vehicle are known. This information can then be processed and utilized to help locate the power lines, navigate along the power lines, and finally dock onto the power lines. The present invention senses the electromagnetic fields and transforms the signals from signals derived in an air frame reference system into signals descriptive of an earth reference system, computes the relative distance to the line and the relative bearing to the line, and uses the information to control the altitude, bearing, and speed of the air vehicle.

It is of course true that electrical energy transmission lines ordinarily comprise more than a single conductor. It has been found experimentally, however, that the electric induction field surrounding even a three-phase transmission line with attending ground wires may be represented at any given point in space by a vector rotating as a function of time in a plane perpendicular to the length of the line. As the field vector rotates, it also changes in amplitude so that the head of the rotating vector describes an ellipse. The size, shape and orientation of the ellipse vary according to the position of a present invention aircraft with respect to the line, with the line configuration, and the voltage of the line. With use of suitably oriented sensors or electrodes on the aircraft, the electric or magnetic induction field vector at any particular point in space may be resolved into its horizontal and vertical components. The amplitude of the vertical and horizontal components and the time phase difference between components are useful to determine the position and orientation of an aircraft with respect to the transmission line.

Most electrical transmission line discussion assumes that line conductors are straight horizontal wires of infinite length. In fact, however these conductors are disposed in the shape of periodic catenaries. The sag of these catenaries depends on individual characteristics of the line and even on environmental conditions such as conductor temperature. Consideration of catenary effects in the technical literature is scarce, since most often they are assumed to be negligible. Nevertheless, whenever analysis of transmission line conductors is concentrated on phenomena in close proximity to the conductors, as in parts of the present invention, the straight wire approximation of a catenary is of less utility. Instead, the effect of the catenary disposition of conductors on the amplitude of an encountered electric or magnetic field is the dominant factor considered in the landing or docking of a small unmanned air vehicle on a conductor of such a transmission line. The ability to measure these electric and/or magnetic field levels using current state of the art sensors whose outputs are processed by various navigation algorithms is hence a significant aspect of the present invention.

The present invention takes advantage of the man-made transmission line geometric "catenary effects" on the generated electric E-Fields and magnetic B-fields and uses this one-dimensional information to help locate the center between transmission line towers/poles as a small unmanned air vehicle surveillance platform approaches for a landing on the transmission line. An example of a vehicle of this type is depicted at 100 in the FIG. 1 drawing herein, additional views of such vehicle appear in the incorporated by reference herein patent documents identified earlier herein. As can be seen, in FIG. 1 such a vehicle is preferably provided with three sensors, 100, 102 and 104, such as, for example, Hall Effect sensors or sensors of the type disclosed in for example U.S. Pat. Nos. 4,649,375 and 5,548,279 and 4,277,771, on board the aircraft platform. Three magnetic sensors are, for example, required to properly measure the magnetic fields in the Bx, By, Bz coordinates of the small unmanned air vehicle.

Figure 1:
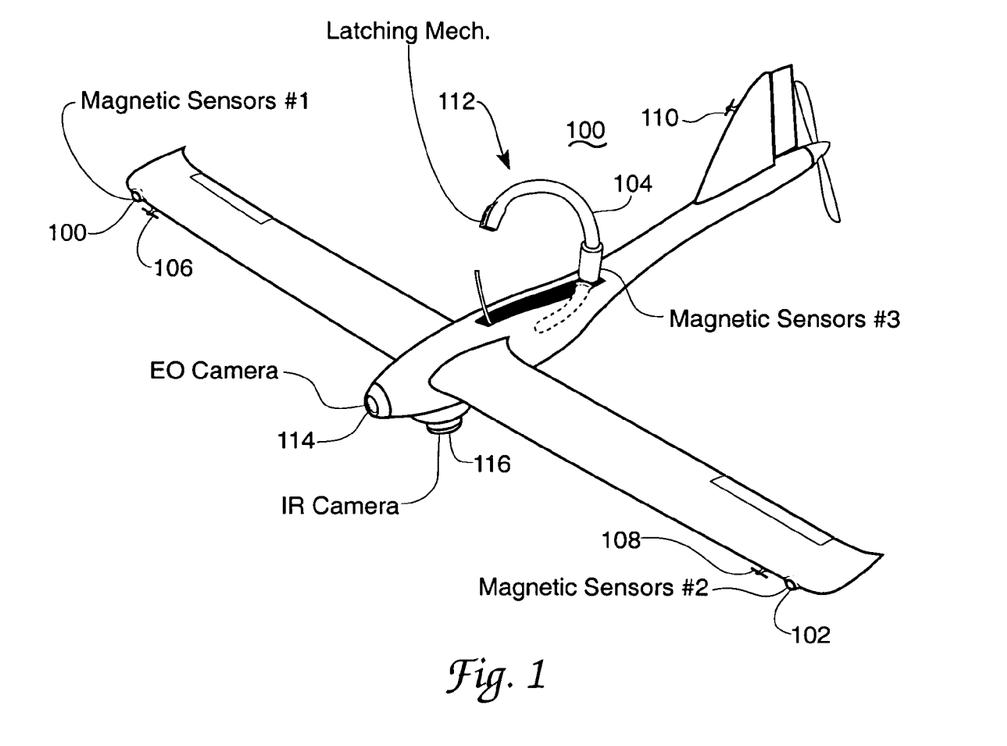
FIG. 1 shows one arrangement of a small unmanned air vehicle that may employ the present invention.

In addition, three electrostatic sensors 106, 108 and 110, are also mounted into the vehicle depicted in FIG. 1. Two of the electrostatic sensors, 106 and 108, are mounted into the wings and the third, 110, is mounted into the tail section. Each of electrostatic detectors may be in fact parallel plate capacitors where, the plates are separated by dielectric material of a desired thickness. In each capacitor the skin of the air vehicle comprises one of the plates. If such a capacitor is exposed to an electric field, a voltage appears between the plates dependent in amplitude on the gradient of the field. This type of field gradient detector is readily understood by those skilled in the art: further reference may also be had to page 42 of the text "UHF PRACTICES AND PRINCIPLES", 1st Edition, by Alan Lytel. The three electrostatic sensors are required to properly measure the electric fields in the Ex, Ey, Ez coordinates of the small unmanned air vehicle.

A visible spectrum electro optic camera 114 can also be embedded into the nose and an IR camera 116 in the underside of the aircraft 100. Radio frequency communications apparatus is also included in the aircraft. Various other sensors such as microphones may also be mounted in the vehicle. The magnetic Hall Effect sensors are used by the aircraft 100 to autonomously locate, follow, and land on the transmission line. A latching mechanism 112, shown on top of the FIG. 1 aircraft retains the aircraft on the transmission line as is also described in the above identified patent documents. Latching mechanism 112 may be coincident with the sensor 104 as appears in FIG. 1. The U.S. patents identified in this paragraph and each other document identified in this document are hereby incorporated by reference herein.

In using the present invention in a far field navigation mode remote transmission lines may be pre-selected, from their global position system and like knowledge, as suitable small unmanned air vehicle travel and landing locations. Such usage is represented in the FIG. 3 drawing herein. Travel exclusively along a transmission line is of course not required and travel between transmission lines or along paths skewed with one or more transmission lines is practical. The GPS location of transmission lines the world over is available public information and is also obtainable from a pre-conflict aerial mapping operation of a geographic area. As such, these geographic locations may be pre-programmed into unmanned air vehicle ROM or RAM memories. Transmission lines removed from an urban area of interest are preferably used for vehicle docking in the interest of vehicle safety. Transmission lines or distribution lines closest to an urban area of interest may be considered for travel or docking use involving needed stationary surveillance or in emergencies or during nighttime operations. To help avoid obstacles, traveling small unmanned air vehicles may thus utilize transmission lines in the nature of "highways" and fly high and above the path of existing lines using altimeter and magnetic sensors until they reach an area of final destination and/or run low on battery energy. A system for far field aircraft navigation, as is contemplated in pre docking flight of a present invention small unmanned air vehicle, is disclosed in the U.S. Pat. No. 4,277,771 of L. H. Chapin et al.; this patent and the other documents identified herein are also hereby incorporated by reference herein.

With respect to near field navigation and docking of a small unmanned air vehicle, all electrical transmission lines are inherently noisy stationary field generating sources. This is useful in the present invention in helping guide vehicles in for a transmission line docking. In essence, transmission line noise acts as a "beacon" since so much noise at 50 and 60 Hertz and other higher frequencies is emitted. During the docking process a small unmanned air vehicle preferably employs magnetic sensors, such as Hall Effect sensors, and electrostatic sensors such as capacitors, to help with locating, guiding, and finally docking on a transmission line conductor. Additional details of this process are disclosed in the paragraphs following.

The effect of a non flat or catenary conductor shape on the electromagnetic fields generated by the conductors of a transmission line has been investigated academically; such effects are desirably considered in the present invention, especially in the small unmanned air vehicle docking situation. The technical journal article "Effects of Conductor Sag on Spatial Distribution of Power Line Magnetic Field", IEEE Transactions on Power Delivery, Volume 11, Number 3, July 1996 by A. V. Mamishev, R. D. Nevels and B. D. Russell has considered these effects of a catenary shaped conductor and presents mathematical equations and graphical representations relating to the electromagnetic fields generated by such transmission line shapes. The Mamishev et al. article originates from a Portland Oreg. IEEE meeting.

Figure 4:
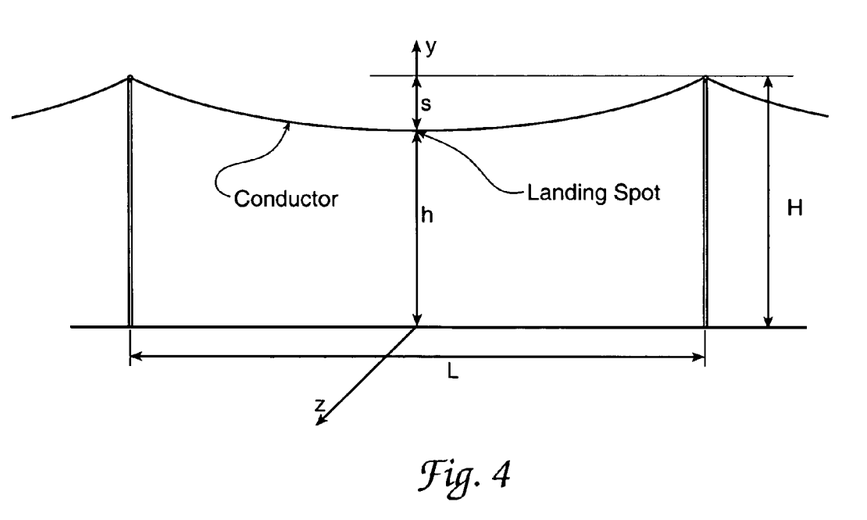
FIG. 4 shows a line drawing view of an area of present invention interest in a FIG. 3 type of transmission line.

To help locate the safe docking center between poles or towers of a transmission line or other power line the fact that all line conductors include designed-in catenary "droop" occurring in a periodic geometric pattern of the type shown in FIG. 4 herein is preferably considered. This "droop", which is basically a hyperbola in shape, can be utilized to locate the center of the conductor span again using magnetic sensors. Note that these graphs are of the magnetic filed gradients only. However, the electric fields follow a similar pattern. The exact shape of a conductor suspended between two poles of equal height is defined by such parameters as the distance between the points of suspension, L, the sag of the conductor, s, and the height of the lowest conductor point, h (normally in the mid-span), and the highest of the highest conductor point, H, as are shown in the FIG. 4 drawing herein. The variables L, s, h, and H, in the FIG. 4 drawing and other details appear in the Mamishev journal article identified herein. Only two constants are needed in order to define the shape of a conductor catenary, and the third parameter determines catenary location in relation to the ground surface. Since the signals detected are orthogonal signal coordinates in an air frame reference they must be transformed to a reference frame which is oriented to the transmission line or an earth coordinate axis system. The well known fact that the electric induction field around the transmission line has no component parallel to the line makes the transformation simpler.

Figure 2A:
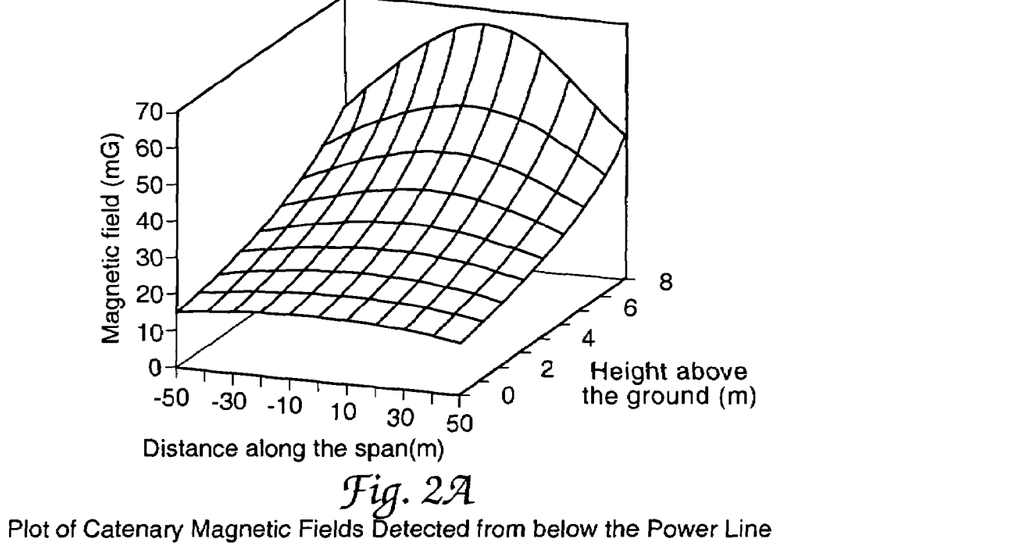
Figure 2B:
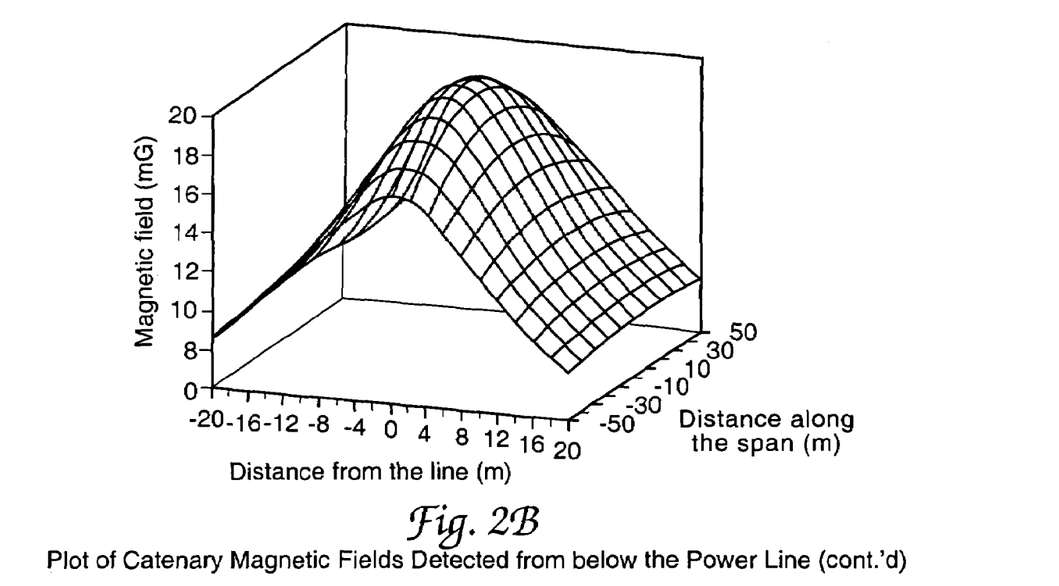

The FIG. 2A and FIG. 2B drawings herein originate in the Mamishev et al. journal article and show how the three dimensional magnetic field of a transmission line varies depending on where an approaching small unmanned air vehicle is located in space with respect to the transmission line. For example, if a small unmanned air vehicle is flying in from a lower position then the magnetic fields appear similar to those represented in the FIG. 2A and FIG. 2B drawings. These two curves represent two differing views of the same three dimensional curve surfaces. FIG. 2A and FIG. 2B show graphs of actual magnetic field strengths in milli-gauss (mG) along the span and height of a particular transmission line. A significant aspect of a present invention docking sequence is detecting the minimum or maximum peak in the magnetic fields as the small unmanned air vehicle is flying in for docking on the transmission line. Curves of the FIG. 2A and FIG. 2B type may of course be developed for small unmanned air vehicle approaches from above or from a lateral direction from the transmission line.

Figure 5:
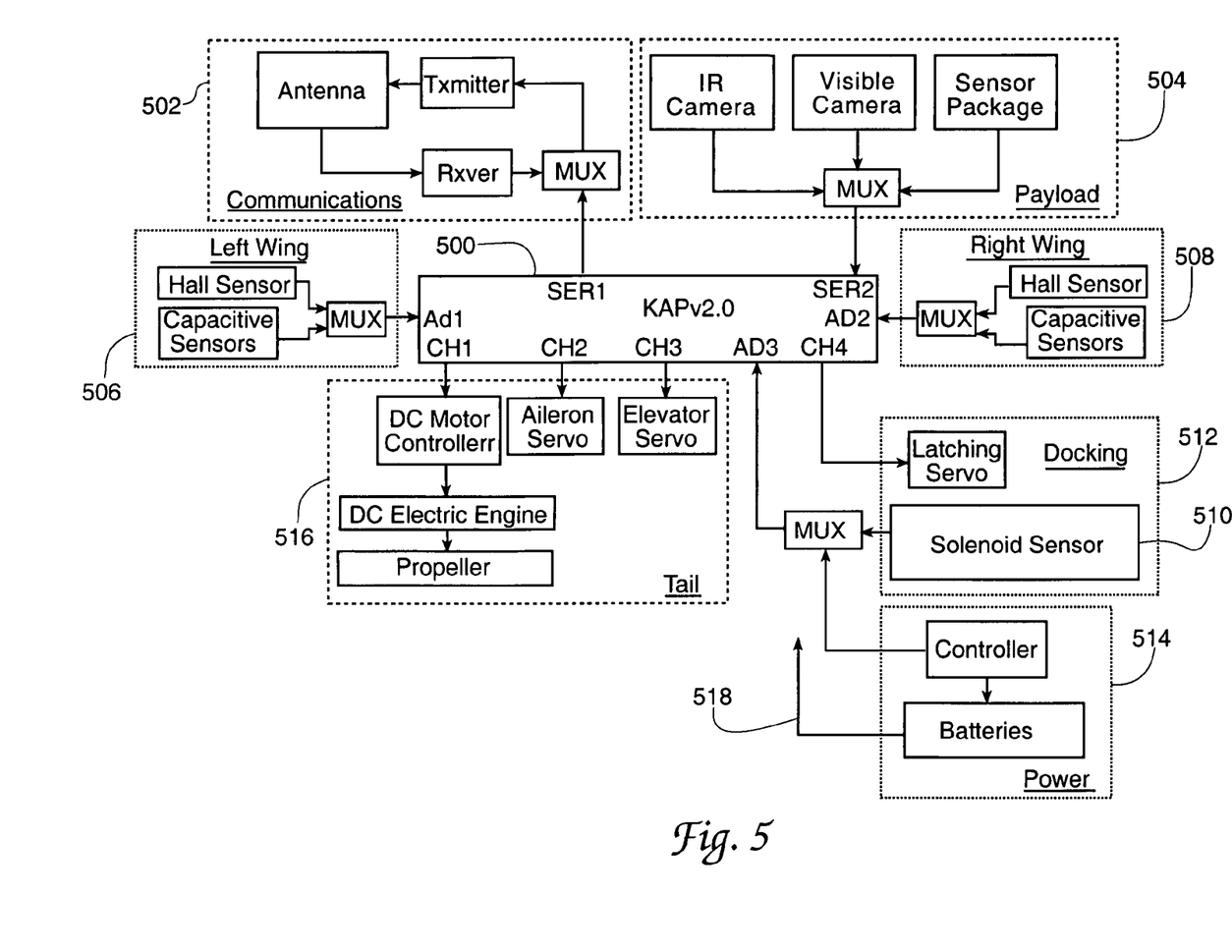
FIG. 5 shows a control circuit block diagram for a small unmanned air vehicle according to the present invention.

With respect to controlling the small unmanned air vehicle during docking, three or more magnetic and/or electrostatic sensors are desired in order to determine roll, pitch, yaw, and distance between the small unmanned air vehicle and the transmission line conductor selected for docking. A block diagram showing the sensor and initial sensor signal processing circuits of the invention appears in the FIG. 5 drawing herein. In FIG. 5 signals from left wing, right wing and aircraft body located sensors at 506, 508 and 510, i.e., magnetic or Hall effect sensors and electric or capacitive sensors as are shown in FIG. 1, are applied to electrical circuits performing integration, amplification and band pass filtering of the transmission line field based signals and then to the Procerus KAPv2.0 printed circuit board 500 or a similar aircraft controller.

The Procerus KAPv2.0 printed circuit board shown at 500 in FIG. 5 is a currently available example of an aircraft autopilot system as may be used in embodying the present invention. The KAPv2.0 board is programmable and has input and output ports including both analog and digital signal outputs. This board also incorporates the on-board sensors needed for autonomous flight control of a vehicle including a small unmanned air vehicle. For example this system includes three-axis gyroscopes, accelerometers, and absolute and differential pressure sensors that provide barometric pressure or altitude control of a vehicle and its air speed. In addition, three temperature sensors provide temperature measurement and sensor temperature compensation for limiting gyroscope drift. A GPS input to the KAPv2.0 board allows a user to select ideal GPS locations to be used independent of autopilot functions. Four serial ports allow for bi-directional communication between payload intercommunication and control in this board. When programmed, the microprocessor of this board can execute the autopilot and landing algorithms for locating, following, and finally docking on a transmission line conductor as espoused in the present invention. The Procerus KAPv2.0 printed circuit board and several other autopilot systems for unmanned aerial vehicle use are made by Procerus Technologies of Orem, Utah, and Vineyard, Utah, 84058, www.procerusuav.com.

FIG. 5 in the drawings thus shows a block diagram wherein the Procerus KAPv2.0 printed circuit board is used in an embodiment relating to the present invention. In this diagram an external radio frequency communications package 502 is connected to a serial port of the KAPv2.0 board and a mission payload package 504 is connected to a second serial port. The solenoid sensor at 510 in the FIG. 5 instance is also a part of the docking package, that is, the FIG. 1 latching mechanism is also used as a docking magnetic signal source in keeping with the indication in the FIG. 1 drawing. The docking system package 512 and flight tail surfaces control package 516 are controlled from additional ports of the KAPv2.0 board as also indicated in the FIG. 5 drawing. Electrical energy for vehicle propulsion, KAPv2.0 board energization and energization of other functions shown in the FIG. 5 drawing is supplied by the rechargeable battery power pack appearing at 514 in the FIG. 5 drawing; path 518 is used to supply such electrical energy.

Through use of the Procerus printed circuit board, or an equivalent arrangement and use of the FIG. 5 disclosed interface with such a board, accomplishment of the flight control, docking and surveillance functions for example disclosed herein is largely converted into a software realization project. Such a realization is believed within the realm of routine accomplishment by persons of ordinary skill in the small unmanned air vehicle and related arts with due knowledge of for example the particular small unmanned air vehicle flight characteristics.

Referring to FIG. 5, the resulting signals from the electrostatic and/or magnetic sensors are converted from analog to digital nature for use in autopilot algorithms with some data to be stored to memory. The electric and/or magnetic sensor-based power line detection and localization portion of the invention assumes 3-D electric and magnetic fields that are searched for a local minimum and/or maximum, depending on the location of the small unmanned air vehicle in space. The electric and/or magnetic sensors generate measurements in x, y, and z directions with magnitudes proportional to the distance to the power line in three dimensions and guide the small unmanned air vehicle, according to changes in these signals with vehicle position, into physical engagement with a transmission line conductor.

Sufficient current flow in a transmission line conductor is of course needed in order to assure a usable magnetic field around the conductor before a small unmanned air vehicle can land or dock on the conductor. A current flow determination may thus require, as part of a small unmanned air vehicle embedded flight plan, a pass-overhead-flight to take prior-readings from the line conductors before a docking maneuver is embarked upon. Dosimeter instruments as are known in the art may be included in the small unmanned air vehicle for this purpose.

Figure 6:
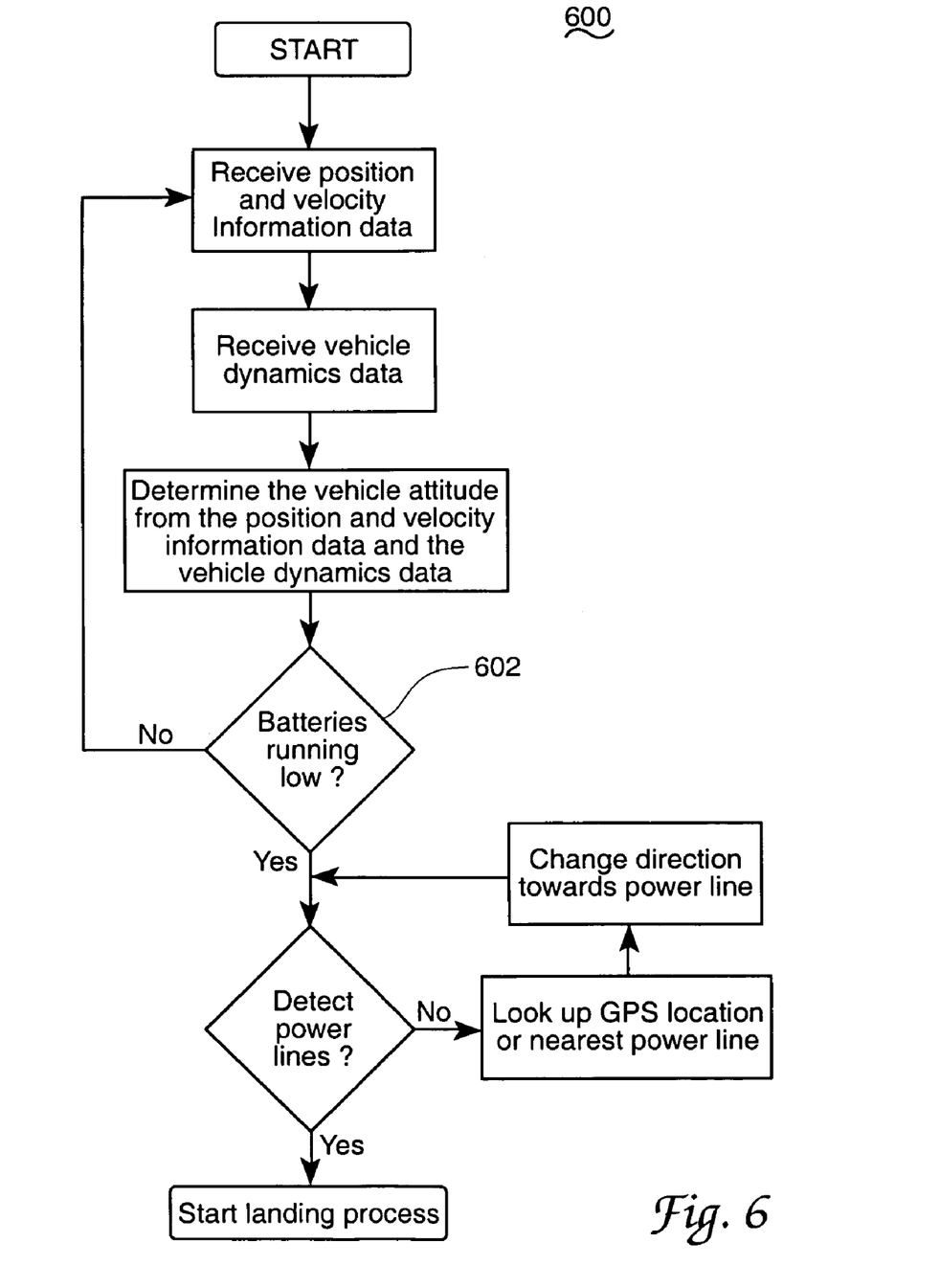
FIG. 6 shows a partial control circuit flow diagram for a small unmanned air vehicle according to the present invention.

A flow diagram for the autopilot for the invention is shown at 600 in the drawing of FIG. 6 herein. After the power line is detected and determined to have sufficient current flowing, it is then selected as a suitable landing base if the air vehicle's batteries are running low on energy as determined at 602 in FIG. 6. During approach, the air vehicle will be maintained at a constant glide slope air speed by controlling the servos and motor speed as shown in FIG. 5. As the air vehicle approaches the power line, its air speed is slowed to a minimum. At the same time, the eclectic and magnetic sensors are used to locate for example the center between two telephone poles or transmission line towers for docking or landing.

While the apparatus and method herein described constitute a preferred embodiment of the invention, it is to be understood that the invention is not limited to this precise form of apparatus or method and that changes may be made therein without departing from the scope of the invention which is defined in the appended claims.

We claim:

1. A small unmanned air vehicle electrical transmission line docking surveillance apparatus comprising the combination of:
    a small unmanned air vehicle having a combination closable magnetic circuit and docking support magnetic field energy responsive element received therein;
    a plurality of electric and magnetic field sensing elements disposed on dispersed external physical portions of said small unmanned air vehicle;
    a small unmanned air vehicle flight control apparatus having an electrical signal input port and a plurality of said small unmanned air vehicle flight surface connected mechanical output signals;
    small unmanned air vehicle electrical propulsion apparatus having an electrical energy input port and an electrical control signal input port;
    a rechargeable electrical battery received within said small unmanned air vehicle and selectively connected with said closable magnetic circuit, said flight surface control apparatus, and said electrical propulsion apparatus; and
    a programmable electronic computer apparatus energized by said rechargeable electrical battery and having electrical output signals controlling said closable magnetic circuit, said flight surface control apparatus, and said electrical propulsion apparatus;
    said programmable electronic computer apparatus including a transmission line catenary shape detection algorithm responsive to signals generated in said electric and magnetic field sensing elements and an unmanned air vehicle guidance algorithm responsive to said vehicle approaching a selected docking location along a vehicle encountered transmission line catenary curve; and said small unmanned air vehicle is configured to dock and recharge while docked on a transmission line.

2. The small unmanned air vehicle electrical transmission line docking surveillance apparatus of claim 1 wherein said programmable electronic computer apparatus also includes a far field navigation algorithm responsive to guidance signals received from a distant electrical transmission line.

3. The small unmanned air vehicle electrical transmission line docking surveillance apparatus of claim 1 wherein said catenary shape detection algorithm selected docking location is an aircraft safety considered catenary center location intermediate transmission line supports.

4. The small unmanned air vehicle electrical transmission line docking surveillance apparatus of claim 1 wherein said plurality of electric and magnetic field sensing elements include sensing elements located on wing segment segregated salient portions of said vehicle.

5. The small unmanned air vehicle electrical transmission line docking surveillance apparatus of claim 1 wherein said plurality of electric and magnetic field sensing elements include Hall effect magnetic sensors.

6. The small unmanned air vehicle electrical transmission line docking surveillance apparatus of claim 1 wherein said programmable electronic computer apparatus includes a programmable aircraft autopilot algorithm.

7. A method of collecting surveillance information from an improved geographic area, said method comprising the steps of:
    guiding an electrically propelled small unmanned air vehicle along a selected flight course in said improved geographic area with aid of electric and magnetic field signals emitted by a ground-based electrical transmission line located in said geographic area;
    electromagnetic field signal sensing by electric and magnetic field responding transducer elements disposed on selected portions of said air vehicle and sensed signal processing in a digital computer disposed within said small unmanned air vehicle enabling said guiding step;
    said guiding step also including converting received transmission line electric and magnetic field electromagnetic signals into aircraft control surface moving signals using an algorithm disposed within said digital computer located in said small unmanned air vehicle;
    said digital computer algorithm including a transmission line conductor catenary curve responding portion having a selected catenary curve segment identifying portion therein;
    controlling said small unmanned air vehicle in speed, altitude, attitude and course of travel into a state of captivity suspended engaging with a selected catenary curve segment of a selected conductor of said transmission line using instructions retained within said digital computer;
    transferring magnetic induction received electrical energy from said transmission line conductor into charging of an electrical propulsion battery located within said small unmanned air vehicle during said state of captive suspended engaging with said selected catenary curve segment of said selected transmission line conductor;
    gathering surveillance information relating to said improved geographic area into said small unmanned air vehicle preceding and during said state of captive suspended engaging with said selected catenary curve segment of said selected transmission line conductor;
    communicating said surveillance information to a remote location of information using; and
    disengaging said small unmanned air vehicle from said transmission line conductor upon command from said remote location of information using.

8. The method of collecting surveillance information from an improved geographic area of claim 7 wherein said step of guiding said air vehicle along a selected flight course includes guiding said vehicle along said ground-based electrical transmission line.

9. The method of collecting surveillance information from an improved geographic area of claim 7 wherein said step of guiding said air vehicle along a selected flight course includes guiding said vehicle along a path oblique to said ground-based electrical transmission line.

10. The method of collecting surveillance information from an improved geographic area of claim 7 wherein said step of guiding said air vehicle along a selected flight course includes guiding said vehicle along a path oblique to a spaced plurality of said ground-based electrical transmission lines.

11. The method of collecting surveillance information from an improved geographic area of claim 7 wherein said selected catenary curve segment comprises an aircraft safe, tower removed catenary central portion.

12. The method of collecting surveillance information from an improved geographic area of claim 7 wherein said step of communicating said surveillance information to a remote location of information using includes communicating by way of a radio frequency communicating link.

13. The method of collecting surveillance information from an improved geographic area of claim 7 wherein said improved geographic area includes a plurality of differing man-made objects.

14. The method of collecting surveillance information from an improved geographic area of claim 7 wherein said step of controlling said small unmanned air vehicle in speed, altitude, attitude and course of travel into a state of captivity suspended engaging with a selected catenary curve segment of a selected conductor of said transmission line includes verifying a suitable level of current flow in said selected conductor.

15. The method of collecting surveillance information from an improved geographic area of claim 7 wherein said step of disengaging said small unmanned air vehicle from said transmission line conductor is also responsive to a signal generated within said air vehicle.

16. The method of collecting surveillance information from an improved geographic area of claim 7 wherein said step of guiding an electrically propelled small unmanned air vehicle along a selected flight course includes use of global position system signals.

17. A method of docking an electrical small unmanned air vehicle on an electrical transmission line conductor comprising the steps of:

guiding said small unmanned air vehicle along a selected flight course with aid of electric and magnetic field signals emitted by a ground-based electrical transmission line, sensed by electric and magnetic field responsive transducer elements disposed on selected portions of said air vehicle and processed in a digital computer disposed within said small unmanned air vehicle;

said guiding step including converting received transmission line electric and magnetic field signals into aircraft control changing surface moving signals using an algorithm disposed within said digital computer located in said small unmanned air vehicle;

said digital computer algorithm including a transmission line conductor catenary curve responsive portion having a selected catenary curve segment locating portion therein;

controlling said small unmanned air vehicle in speed, altitude, attitude and course of travel into a state of captive suspended engagement with a selected catenary curve segment of a selected conductor of said transmission line using docking instructions received within said digital computer; and transferring magnetic induction received electrical energy from said transmission line conductor into charging of an electrical energization battery located within said small unmanned air vehicle during said state of captive suspended engagement with said selected catenary curve segment of said selected transmission line conductor.

18. The method of docking an electrical small unmanned air vehicle on an electrical transmission line conductor of claim 17 further including performing aerial surveillance during a portion of said vehicle guiding step and a subsequent vehicle releasing step.

* * * * *